(12) United States Patent
Yoshida

(10) Patent No.: US 7,229,395 B2
(45) Date of Patent: Jun. 12, 2007

(54) COVER STRUCTURE OF A MACHINE TOOL

(75) Inventor: Makoto Yoshida, Aichi (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 11/540,744

(22) Filed: Sep. 29, 2006

(65) Prior Publication Data

US 2007/0078043 A1 Apr. 5, 2007

(30) Foreign Application Priority Data

Sep. 30, 2005 (JP) .............................. 2005-287673

(51) Int. Cl.
  *B23Q 3/157* (2006.01)
  *B23Q 11/08* (2006.01)
  *B23Q 13/00* (2006.01)
(52) U.S. Cl. ........................................... 483/3
(58) Field of Classification Search ................ 483/3, 483/30–32, 36, 39–41; 409/134; 29/DIG. 86; 74/608–609; 408/241 G
See application file for complete search history.

(56) References Cited

U.S. PATENT DOCUMENTS

| | | | | |
|---|---|---|---|---|
| 3,930,302 A | * | 1/1976 | Ochiai et al. ................... | 483/3 |
| 4,601,094 A | * | 7/1986 | Myers ............................. | 483/3 |
| 4,742,609 A | * | 5/1988 | Neumann ...................... | 483/3 |
| 4,837,918 A | * | 6/1989 | Holy et al. .................... | 483/25 |
| 5,224,916 A | * | 7/1993 | Chang ............................ | 483/3 |
| 5,649,887 A | * | 7/1997 | Taki et al. ...................... | 483/3 |

FOREIGN PATENT DOCUMENTS

| | | | |
|---|---|---|---|
| DE | 10350657 A1 | * | 6/2005 |
| JP | 2-106247 A | * | 4/1990 |
| JP | 4-360746 A | * | 12/1992 |
| JP | 5-169338 A | * | 7/1993 |
| JP | 8-66836 A | * | 3/1996 |
| JP | 09-309044 A1 | | 12/1997 |
| JP | 2000-135650 A | * | 5/2000 |
| JP | 2003-80427 A | * | 3/2003 |
| JP | 2003-275940 A | * | 9/2003 |
| SU | 1757845 A1 | * | 8/1992 |

* cited by examiner

*Primary Examiner*—Erica Cadugan
(74) *Attorney, Agent, or Firm*—Burr & Brown

(57) ABSTRACT

A cover structure of a machine tool with a simple structure which improves work efficiency by minimizing an opening portion. An opening portion is defined in a reverse concave shape at one lateral side of a cover. The opening portion includes two tool passing portions and a turning permission portion connecting the tool passing portions. A tool T which is held by an exchange arm passes through each tool passing portion. On the other hand, a rotation base portion of the exchange arm passes through the turning permission portion. While each tool passing portion is closed by a door, the turning permission portion is closed by a closing cover including a turning cover and a slide cover.

2 Claims, 4 Drawing Sheets

COVER STRUCTURE OF A MACHINE TOOL

BACKGROUND OF THE INVENTION

This application claims the benefit of Japanese Patent Application Number 2005-287673 filed on Sep. 30, 2005, the entirety of which is incorporated by reference.

1. Field of the Invention

The present invention relates to a cover structure for covering a cutting space in a machine tool.

2. Description of the Related Art

Conventionally, a cutting space 52 of a machine tool 51 is covered with a cover 53 as shown in FIG. 4. The cover 53 has an opening portion 55 which is opened and closed by a slide door 56. When the door 56 is slid to open the opening portion 55, a tool exchange device 57 rotates an exchange arm 58 for inserting the exchange arm 58 into the cutting space 52 through the opening portion 55, and exchanges tools (not shown) attached to a main spindle 54 of the machine tool 51.

Another cover structure of a machine tool is proposed as disclosed in Japanese unexamined patent publication No. 09-309044, where a plurality of doors are used to open and close an opening portion defined in a cover. This cover structure of the machine tool is explained based on FIG. 5, which shows an explanatory cross-sectional plain view.

In this cover structure of the machine tool, an opening portion 64 which is V-shaped in a plain view is defined on a cover 63 which covers a cutting space 62. As a door for opening and closing the opening portion 64, a first door 65 which is V-shaped in a plain view and a small-sized second door 66 are mounted. The first door 65 is slidable along a guide axis 67 and the second door 66 is pivotable around a vertical axis 68. With this configuration, the first door 65 and the second door 66 are synchronized to open and close the opening portion 64 by means of a door opening/closing mechanism 72 including a drive shaft 69, a sector gear 70, and a sprocket wheel 71, etc.

However, in the structure as shown in FIG. 4, because a frontage of the opening portion is opened and closed by a single door, it is necessary to have a longer stroke of opening and closing the door. Consequently, it takes time to open and close the door, which would be an obstacle to a quick working.

On the other hand, in the structure disclosed in Japanese unexamined patent publication No. 09-309044, since a plurality of doors are used upon opening and closing the opening portion, each opening and closing stroke of the door can be shortened. However, the door opening/closing mechanism becomes complex as described above, so that a higher cost is required as the cost of equipment, etc. Moreover, the overall equipment needs to be enlarged because space for installing the door opening/closing mechanism is required.

Moreover, in a conventional structure as shown in FIGS. 4 and 5, a portion which needs not to be open (for example, a portion except a tool passing portion, such as an upper or lower portion of the opening portion, and a portion on the axis line of the exchange arm) is made to be open as the opening portion. In other words, the opening portion has a broad area which is unnecessary to be opened and closed. As a result, there are problems of waste of time, deterioration of work efficiency, and so on. Further, even if the opening portion is made to be open only at the time of tool exchange, there is a problem that cutting dust or cutting fluid used in working, etc. easily disperses outside the cutting space as long as an opening area is broad.

In view of the above, an object of the present invention is to provide a cover structure of a machine tool with a simple structure which improves work efficiency by minimizing an opening portion.

SUMMARY OF THE INVENTION

In order to solve the above problem, according to a first aspect of the present invention, there is provided a cover structure of a machine tool having a cover for covering a cutting space; a main spindle provided in the cutting space; and a tool exchange apparatus having an exchange arm for rotating beyond inner and outer portions of the cutting space in order to exchange tools attached to the main spindle. The cover comprises: an opening portion through which the exchange arm holding a tool passes; and a door for opening and closing the opening portion, wherein the opening portion is small and narrow-sized shape which is closed except a passing area of the exchange arm holding a tool, and the door partially or entirely opens and closes the opening portion.

According to a second aspect of the present invention, there is provided a cover structure of a machine tool according to the first aspect, wherein the cover has a small and narrow-sized opening portion including a pair of tool passing portions through which a tool held by the exchange arm passes; and a turning permission portion for connecting the tool passing portions and allowing a rotation base portion of the exchange arm to pass through, and wherein the tool passing portions are opened and closed by doors, and a closing cover for closing the turning permission portion is attached to the exchange arm.

According to the present invention, only a portion which interferes with rotative operation of the exchange arm serves as an opening portion which are opened and closed by the door. In other words, the opening portion is made to be minimum, so that an opening and closing stroke of the door becomes short. Due to this, as the opening and closing time of the door can be shortened, working time can be shortened, and thus quick working can be achieved. Moreover, as the frontage of the opening portion becomes smaller and the opening and closing stroke of the door becomes short, the cover can be downsized, which leads to overall downsizing of the machine tool.

Moreover, compared to a structure in which a plurality of doors open and close one opening portion, the opening and closing stroke is minimized with a simpler structure, so that effects of cost saving and improved usability can be additionally realized. In addition, since the opening portion is a minimum required space, it is possible to prevent cutting dust or cutting fluid from dispersing outside the cutting space upon tool exchange.

According to the second aspect of the present invention, the opening portion is configured to include the turning permission portion which connects the tool passing portions, and the turning permission portion is closed by the closing cover attached to the exchange arm. Consequently, the turning permission portion is opened and closed automatically in accordance with rotative operation of the exchange arm. This means that the rotative operation of the exchange arm and opening and closing operation of the closing cover are synchronized with an extremely simple configuration. As a result, the cost for the cover structure is decreased and productivity is further improved. In addition, since the turning permission portion is covered with the closing cover, the cutting dust or the cutting fluid is not dispersed from the turning permission portion upon working, etc.

DETAILED DESCRIPTION OF THE PREFERRED EMBODIMENTS

Hereinafter, a cover structure of a machine tool as an embodiment according to the present invention will be explained with reference to drawings. Here, the machine tool is explained as a vertical machining center 1, which is one embodiment thereof.

Figure 1:
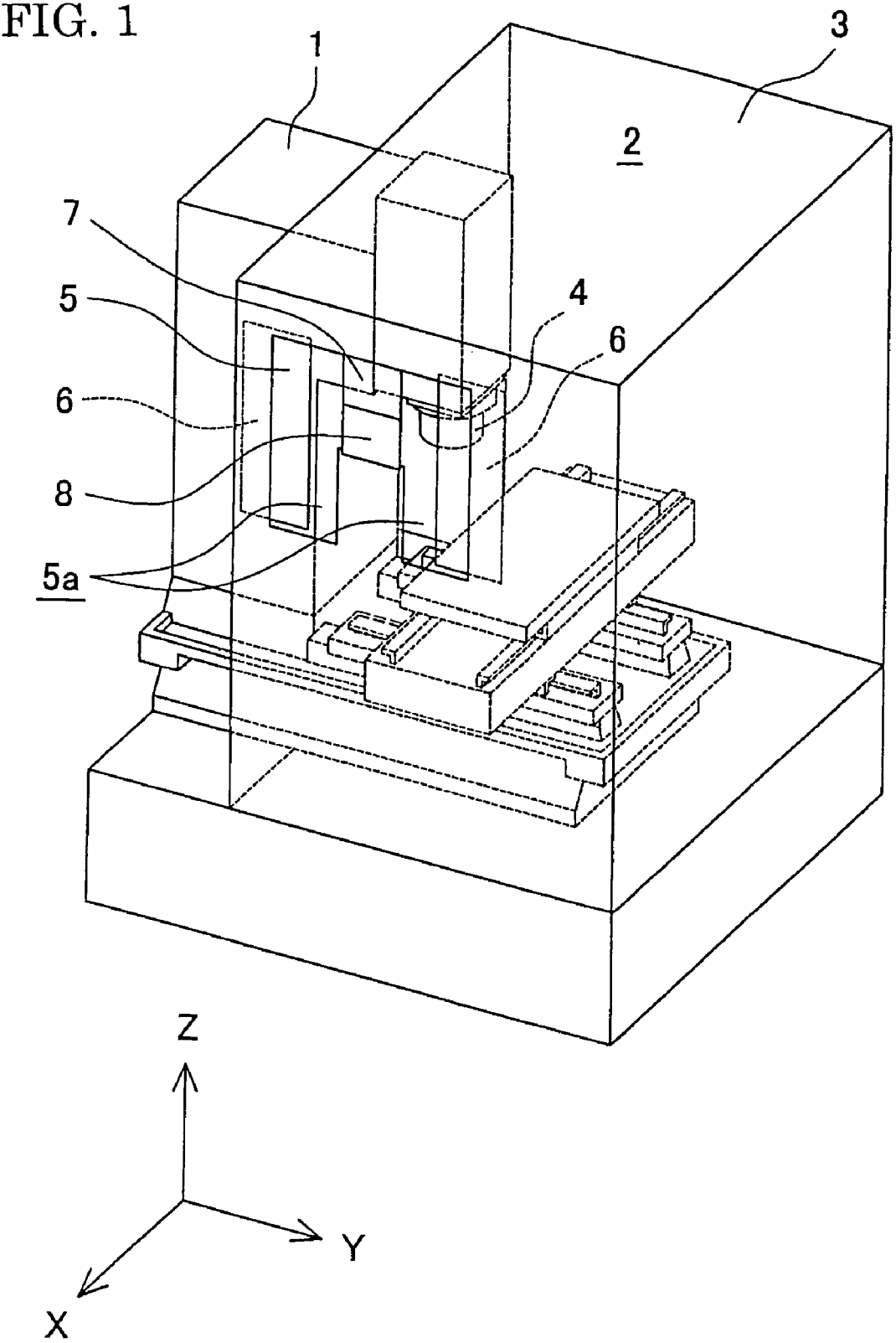
FIG. 1 is an explanatory perspective view showing an outer appearance of a vertical machining center.
Figure 2:
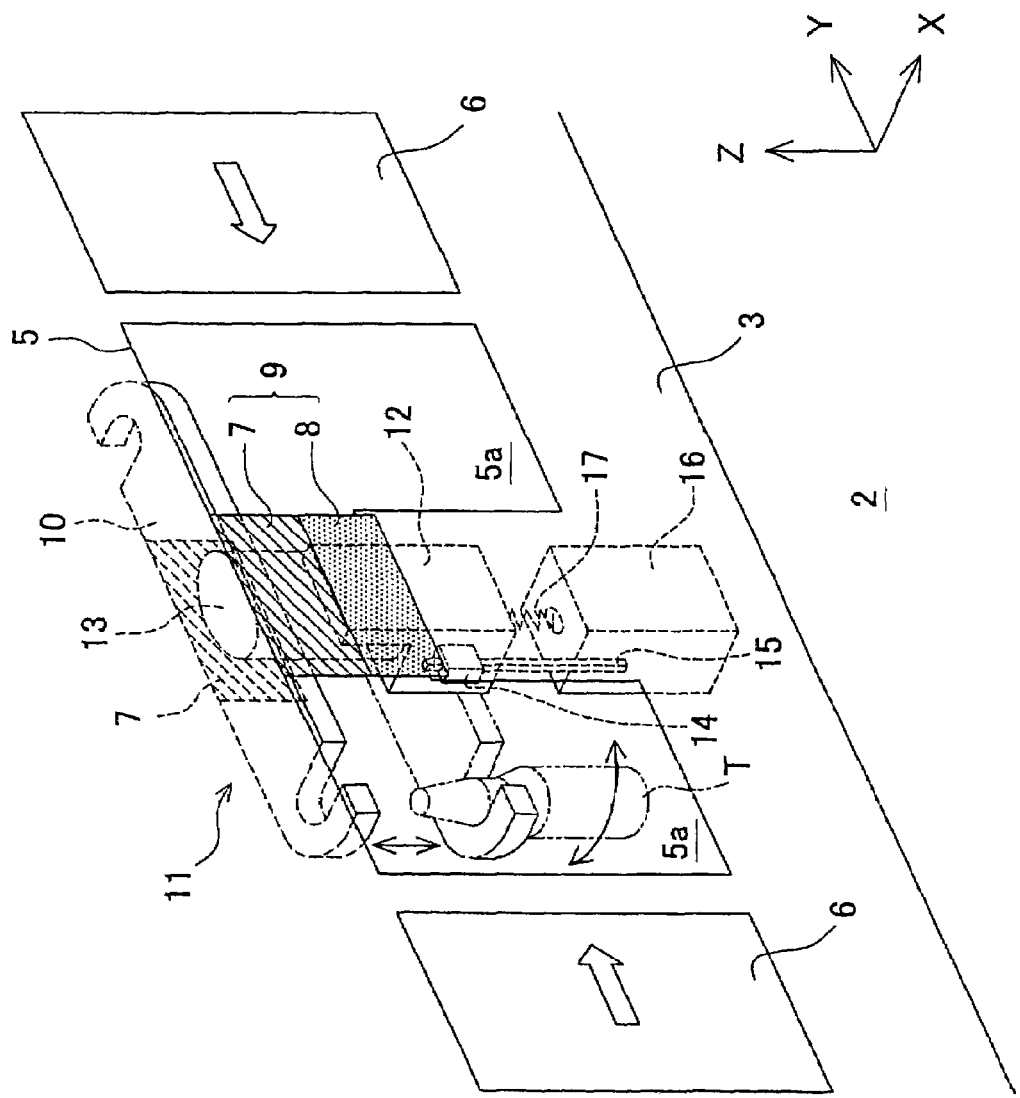
FIG. 2 an explanatory perspective view of a cover viewed from a cutting space of the vertical machining center.
Figure 3:
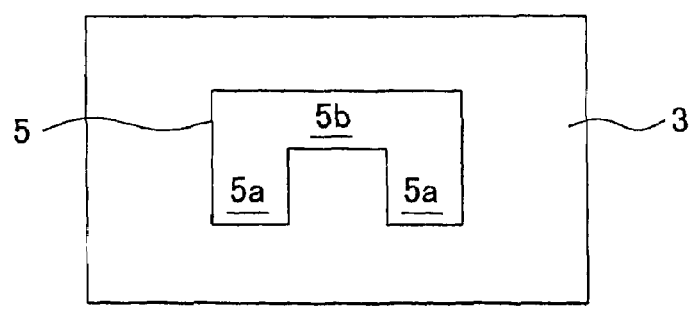
FIG. 3 is an explanatory side view of the cover.
Figure 4:
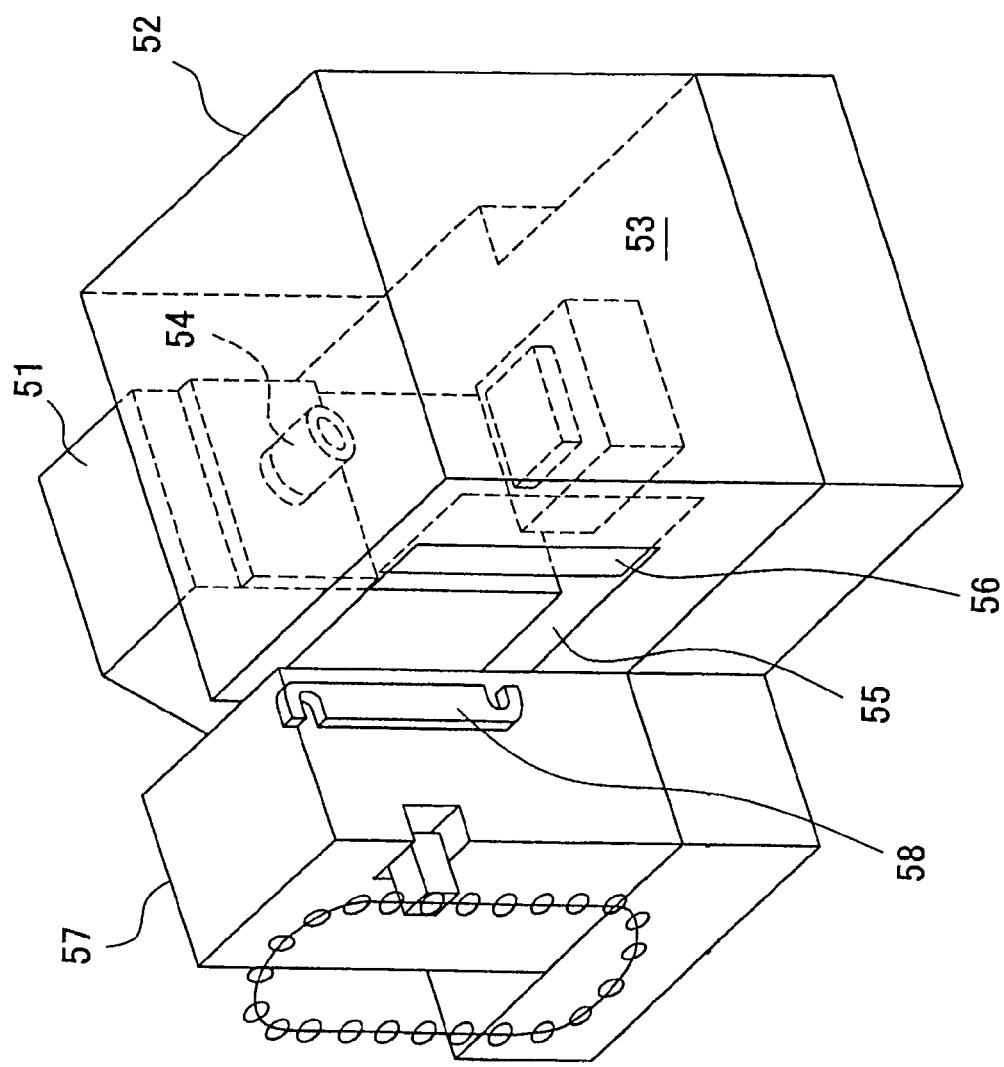
FIG. 4 is an explanatory perspective view of a conventional cover structure.
Figure 5:
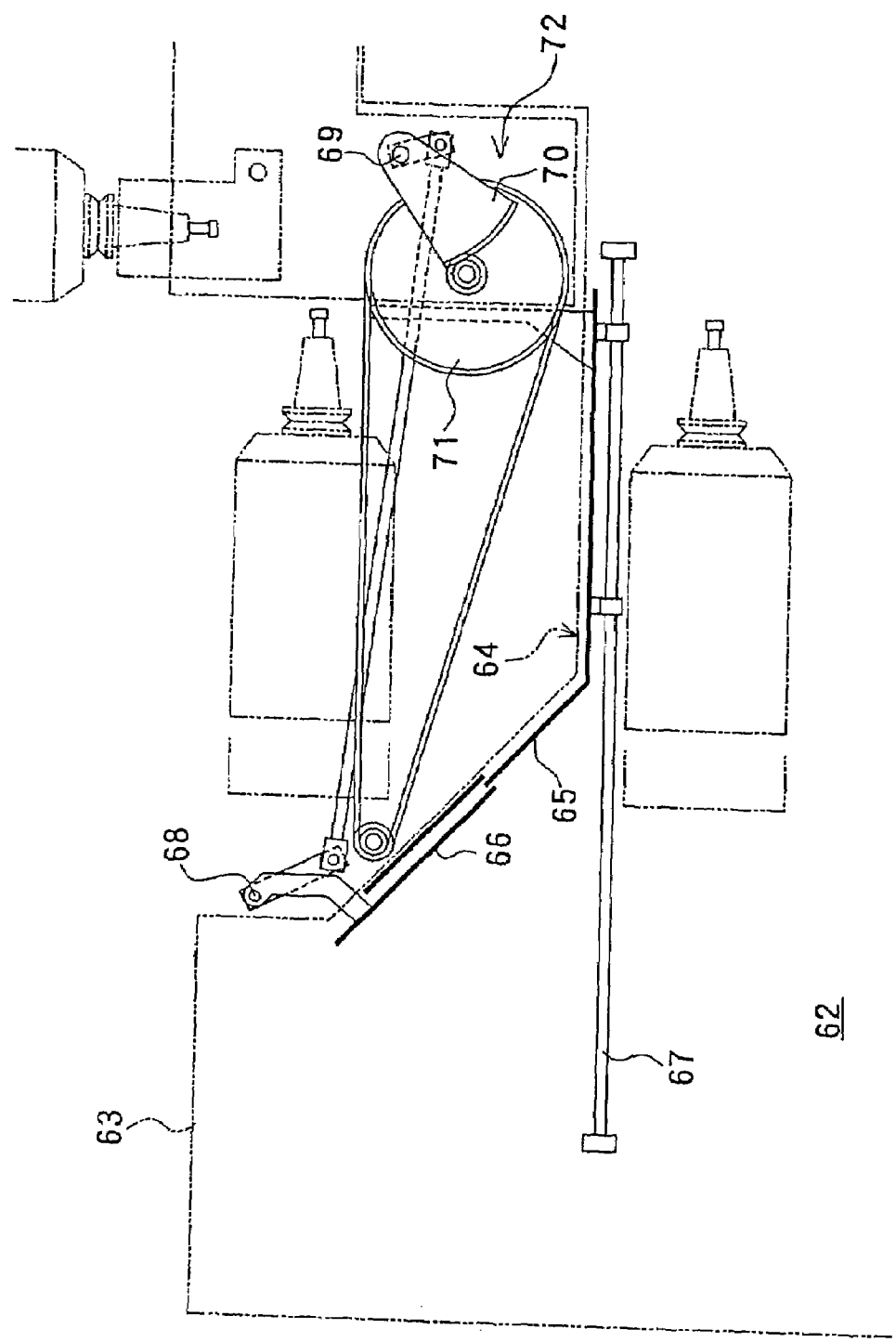
FIG. 5 is an explanatory cross-sectional plain view showing a conventional cover structure.

FIG. 1 is an explanatory perspective view showing an outer appearance of a vertical machining center 1 (a tool exchange mechanism such as an exchange arm 10 is omitted). FIG. 2 is an explanatory perspective view of a cover 3 viewed from a cutting space of the vertical machining center 1. FIG. 3 is an explanatory side view of the cover 3. In FIGS. 1 and 2, it is determined that the X-axis is the lateral direction, the Z-axis is the vertical direction and the Y-axis is the longitudinal direction.

The vertical machining center 1 includes a main spindle 4 rotatable around an axis line parallel to the Z-axis, and the cover 3 is arranged so as to cover the cutting space 2 in which the main spindle 4 is disposed. Atone lateral side of the cover 3, an opening portion 5 in a reverse concave shape is defined. The opening portion 5 includes two tool passing portions 5a, 5a formed in a rectangle extending in the vertical direction and a turning permission portion 5b connecting the tool passing portions. Each tool passing portion 5a is an opening for allowing a tool T held by an exchange arm 10 to pass through upon tool exchange as described below, and formed in a rectangular shape corresponding to an entire length and maximum width of the tool T. On the other hand, the turning permission portion 5b is an opening for allowing a portion near the rotation axis of the exchange arm 10 (that is, a rotation base portion) to pass through upon rotation of the exchange arm 10. The vertical length of the turning permission portion 5b is slightly larger than that of the exchange arm 10, but smaller than that of the tool passing portion 5a. The tuning permission portion 5b is formed in such a manner that it connects both upper portions of the tool passing portions 5a, 5a.

Near the tool passing portions 5a, 5a, doors 6a, 6a for opening and closing the tool passing portions 5a, 5a are mounted respectively. Each door 6 is slid along the Y-axis by means of an air cylinder and so on between an opening position for opening the tool passing portion 5a and a closing position for closing the same. FIG. 2 shows that each door 6 is positioned in an opening position.

On the other hand, a tool exchange apparatus 11 for exchanging tools T attached to the main spindle 4 is installed on an outer portion of the cover 3, being adjacent to the opening portion 5 (that is, on the left side of the cover 3). The tool exchange apparatus 11 includes a rotation unit 12 to which the exchange arm 10 is rotatably mounted, a main body 16 for moving the rotation unit 12 vertically along the Z-axis, and a tool magazine (not shown). Rotative operation of the exchange arm 10 and slide operation of the rotation unit 12 enable exchanging tools T attached to the main spindle 4.

The rotation unit 12 includes the exchange arm 10 via a speed reduction mechanism 13. The exchange arm 10 is rotatable around a line parallel to the Z-axis (horizontal rotation) driven by a motor housed in the rotation unit 12. The rotation unit 12 is connected to the main body 16 via a ball screw 17 and is slidable in the vertical direction driven by a motor housed in the main body 16. While the rotation unit 12 has a slide body 14, the main body 16 has a guide 15, which is arranged parallel to the Z-axis, for guiding the slide body 14. The slide body 14 and the guide 15 serve as a guide mechanism for guiding the rotation unit 12.

The tool exchange apparatus 11 includes a closing cover 9 for covering the turning permission portion 5b of the opening portion 5. The closing cover 9 is comprised of turning covers 7, 7 for covering substantially an upper part of the turning permission portion 5b and a slide cover 8 for covering substantially a lower part of the turning permission portion 5b. The turning covers 7, 7 are provided on both lateral sides of the exchange arm 10. Where either of the turning covers 7 is fit at a closing position, the turning permission portion 5b is closed. The turning covers 7, 7 are turnable as well as slidable together with the exchange arm 10. (That is, rotation of the exchange arm 10 makes the turning covers 7, 7 turn correspondingly, and vertical sliding of the exchange arm 10 along with the rotation unit 12 makes the turning covers 7, 7 slide correspondingly.) On the other hand, the slide cover 8 is provided at an upper right portion of the rotation unit 12 (that is, on the side of the cover 3), and is slidable together with the rotation unit 12. With the closing cover 9 comprised of the turning covers 7, 7 and the slide cover 8, the turning permission portion 5b of the cover 3 is closed all the time except while the exchange arm 10 is operated to rotate. The upper end of the turning covers 7, 7 slightly protrudes upward from an upper surface of the exchange arm 10. On the other hand, the lower end of the slide cover 8 slightly protrudes downward from the turning permission portion 5b and extends in the cutting space 2.

Here, tool exchange using the vertical machining center 1 and the tool exchange apparatus 11 as described above will be explained.

When an instruction of tool exchange is made by a NC device (not shown), firstly an air cylinder starts to be driven to slide the doors 6, 6 from the closing position to the opening position, and the tool passing portions 5a, 5a are opened. When the tool passing portions 5a, 5a are opened, the exchange arm 10 rotates 90 degrees, with one end holding a tool attached to the main spindle 4 (a main spindle tool) and the other end holding a replace tool (a tool in a not shown tool magazine). In this rotation, since the turning cover 7 near the cover 3 turns together with the exchange arm 10, the turning permission portion 5b is partially opened automatically. As a result, the exchange arm 10 can be inserted into the cutting space 2 without being blocked by the closing cover 9.

In a situation described above, the rotation unit 12 (and the exchange arm 10) is next slid in the lower direction to draw the tool attached to the main spindle 4 downward. During this operation, the turning covers 7, 7 are turned 90 degrees against the slide cover 8, whereas the slide cover 8 maintains a partial closing of the turning permission portion 5b, and the turning covers 7, 7 and the slide cover 8 slide in the lower direction together with the rotation unit 12 (and the exchange arm 10).

After the tool is drawn from the main spindle 4, the exchange arm 10 rotates 180 degrees to exchange positions of the main spindle tool and the replace tool. That is, while the main spindle tool moves to a position outside the cutting space, the replace tool moves to a position from outside to inside the cutting space 2. Consequently, the main spindle tool and the replace tool pass the tool passing portions 5a, 5a being held by the exchange arm 10.

When positions of the main spindle tool and the replace tool are exchanged, the rotation unit 12 (and the exchange arm 10) slides upward and inserts the replace tool into the main spindle 4 to be fitted. In this fitting, the turning covers 7, 7 and the slide cover 8 slide upward together with the rotation unit 12 (and the exchange arm 10) similarly to the case of drawing.

When fitting to the main spindle 4 is finished, the exchange arm 10 rotates 90 degrees in a reverse direction and the air cylinder is driven to slide the doors 6, 6, from the opening position to the closing position, and the tool passing portions 5a, 5a are closed. The exchange arm 10 rotates reversely at the last, so that a turning cover 7 which is different from that covering before tool exchange is arranged at a position to partially close the turning permission portion 5b. (That is, a different turning cover 7 covers the turning permission portion 5b before and after the tool exchange.)

In this way, tool exchange is performed. It should be noted that rotative operation of the exchange arm, sliding operation of the rotation unit, and opening and closing operation of the doors are controlled by the NC device and so on.

According to a cover structure as described above, only the tool passing portions 5a, 5a are opened and closed by the doors 6,6 for being passed by the tool in accordance with rotative operation of the exchange arm 10. Consequently, a small frontage is sufficient to be the opening portion 5 (the tool passing portion 5a), so that an opening and closing stroke becomes short. Due to this, as the opening and closing time of the door can be shortened, working time can be shortened, and thus quick working can be achieved. Moreover, as the frontage of the opening portion 5 becomes smaller and the opening and closing stroke of the door 6 becomes short, the cover 3 is downsized, which leads to overall downsizing of the vertical machining center 1.

Moreover, compared to a structure in which a plurality of doors open and close one opening portion, opening and closing stroke is minimized with a simpler structure, so that effects of cost saving and improved usability can be additionally realized. In addition, since only a minimum required portion is opened upon tool exchange, it is possible to prevent cutting dust or cutting fluid used in working from dispersing outside the cutting space.

Moreover, since the opening portion 5 is configured to include the turning permission portion 5b which connects the tool passing portions 5a, 5a, when the exchange arm 10 corresponds to a position of the turning permission portion 5b, the exchange arm 10 is rotatable freely without complicated structure and control. Moreover, since the closing cover 9 covers the turning permission portion 5b, the cutting dust or the cutting fluid is not dispersed from the turning permission portion 5b upon working, etc.

Moreover, since the turning covers 7, 7 mounted on the exchange arm 10 serve as the closing cover 9 for closing the turning permission portion 5b, the turning permission portion 5b is opened and closed automatically in accordance with rotative operation of the exchange arm 10. In other words, the rotative operation of the exchange arm 10 and opening and closing operation of the closing cover 9 are synchronized with an extremely simple configuration, which achieves a remarkably reasonable configuration. In addition, because the closing cover 9 is comprised of the turning covers 7, 7 and the slide cover 8, an extremely narrow opening is sufficient in the turning permission portion 5b upon rotation of the exchange arm 10. Thus, it is possible to reduce the size of the turning covers 7, 7. According to this configuration, besides the cutting dust or the cutting fluid is not dispersed, there is no concern that problems would occur, for example, enlargement of a motor for the exchange arm 10 due to enlargement of the turning covers 7, 7, and deceleration of a rotation speed of the exchange arm.

The cover structure according to the present invention is not limited to the embodiment as described above, and structures of a cover, a machine tool, a tool exchange mechanism can be modified within the scope of the present invention.

For example, although in the above embodiment the doors for opening and closing the tool passing portions are slid along the Y-axis direction, they may be slid along the Z-axis direction or may be slid obliquely on the Y-Z plane. Alternatively, the doors may be configured so that they are rotating to open and close the opening portion other than sliding.

Although a machine tool is a vertical machining center in the above embodiment, the cover structure according to the present invention may be applied to a horizontal machining center. In such a case, a position or shape of the tool passing portion or the turning permission portion may be modified in accordance with the shape of the tool exchange arm or its operation.

Moreover, although in the above embodiment the closing cover is comprised of the turning cover and the slide cover, it is naturally acceptable that the closing cover is comprised only of the turning cover.

What is claimed is:

1. A cover structure of a machine tool having a cover for covering a cutting space; a main spindle provided in the cutting space; and a tool exchange apparatus having an exchange arm for rotating beyond inner and outer portions of the cutting space in order to exchange tools attached to the main spindle, the cover comprising:
an opening portion through which the exchange arm holding a tool passes; and
a door for opening and closing the opening portion,
wherein the opening portion is small and narrow-sized shape which is of approximately similar size and shape of a passing area of the exchange arm holding a tool, and the door partially or entirely opens and closes the opening portion.

2. A cover structure of a machine tool according to claim 1, wherein the small and narrow-sized opening portion includes:
a pair of tool passing portions through which a tool held by the exchange arm passes; and
a turning permission portion for connecting the tool passing portions and allowing a rotation base portion of the exchange arm to pass through,
and wherein the tool passing portions are opened and closed by doors, and a closing cover for closing the turning permission portion is attached to the exchange arm.

* * * * *